(12) United States Patent
Nguyen et al.

(10) Patent No.: US 11,625,669 B2
(45) Date of Patent: Apr. 11, 2023

(54) MONITORING OBJECTS IN A SUPPLY CHAIN USING AN IMMUTABLE DATA STORE

(71) Applicant: United Solutions LLC, Rockville, MD (US)

(72) Inventors: David T. Nguyen, Rockville, MD (US); Christopher M. Verhoeven, Gaithersburg, MD (US)

(73) Assignee: United Solutions LLC, Rockville, MD (US)

( * ) Notice: Subject to any disclaimer, the term of this patent is extended or adjusted under 35 U.S.C. 154(b) by 34 days.

(21) Appl. No.: 17/323,783

(22) Filed: May 18, 2021

(65) Prior Publication Data

US 2022/0374832 A1    Nov. 24, 2022

(51) Int. Cl.
*G06Q 10/0833* (2023.01)
*G06K 7/14* (2006.01)
*G06Q 10/083* (2023.01)
*G06Q 10/087* (2023.01)

(52) U.S. Cl.
CPC ....... *G06Q 10/0833* (2013.01); *G06K 7/1443* (2013.01); *G06Q 10/087* (2013.01); *G06Q 10/0838* (2013.01); *G06Q 2220/00* (2013.01)

(58) Field of Classification Search
CPC ........... G06Q 10/0833; G06Q 10/0838; G06Q 10/087; G06Q 2220/00; G06K 7/1443

USPC .......................................................... 705/22
See application file for complete search history.

(56) References Cited

U.S. PATENT DOCUMENTS

| 2009/0024584 A1* | 1/2009 | Dharap | .................. H04L 69/00 |
| 2021/0357386 A1* | 11/2021 | Pratt | ...................... A63F 13/85 |
| 2022/0245574 A1* | 8/2022 | Celia | ...................... G06F 9/451 |

OTHER PUBLICATIONS

IBM, "Food Trust", <https://www.ibm.com/blockchain/solutions/food-trust>, website available at least as early as Mar. 2018, 9 pages.

* cited by examiner

*Primary Examiner* — Garcia Ade
(74) *Attorney, Agent, or Firm* — Michael Best & Friedrich LLP (57) ABSTRACT

A system for tracking items within a value chain, the system comprising an electronic processor. The electronic processor is configured to create a first object in response to an input, the first object including first identifying metadata, receive an action, and apply the action to the first object to modify the first object into a second object and modify the first identifying metadata into second identifying metadata. The electronic processor is further configured to link the second object to the first object, receive a request to retrieve a history of the second object, and generate the history, wherein the history includes the first object, the first identifying metadata, the action, the second object, and the second identifying metadata.

20 Claims, 11 Drawing Sheets

| ID  | ORGANIZATION   | PUBLIC KEY | PRIVATE KEY | EXPIRATION DATE | BLOCKCHAIN |
|-----|----------------|------------|-------------|-----------------|------------|
| 01  | ORGANIZATION 1 | ...        | ...         | ...             | ...        |
| 02  | ORGANIZATION 2 | ...        | ...         | ...             | ...        |
| 03  | ORGANIZATION 3 | ...        | ...         | ...             | ...        |
| ... | ...            | ...        | ...         | ...             | ...        |

COMMON ELEMENTS

When the items were going through step Materials Received on 4/10/2020 12:15 am and 4/11/2020 09:45 am materialType: Cotton
ingestingFactory: Jakarta 3
machineNumber: 72
employee: 1209

When the items were going through step Thread Spinning on 4/21/2020 11:05 am and 4/21/2020 12:05 am machineNumber: 72
employee: 1209

*FIG. 8*

MONITORING OBJECTS IN A SUPPLY CHAIN USING AN IMMUTABLE DATA STORE

SUMMARY

Value chains, for example, supply chains, have a variety of items moving from point to point, for example, ingredients being gathered and provided to a restaurant, or drugs traveling from a manufacturing center to a pharmacy. Businesses may wish to track the identity, provenance, and "flow" of such items to manage their value chain. Metadata may be inserted into the items, events, and transformations to provide context and automation. The chain of items, events, and transformations, as well as their metadata, may be stored in a shared, distributed digital ledger, for example, a blockchain.

Oftentimes, several organizations work together to move items within a value chain. For example, one organization may handle cutting trees and turning them into usable wood, while another organization crafts the wood into a table. The entities within the value chain may post their own transactional data onto the digital ledger to protect their identity and business strategy. In this manner, receipts between organizations may be stored to increase assurance. Buyers can track the entire provenance of items within the supply chain prior to their purchase. Additionally, bottlenecks in the value chain may be identified by tracking exchanges in ownership or events and transformations of items within the value chain.

Disclosed herein are systems and methods for tracking items within a value chain. One embodiment provides a system comprising an electronic processor. The electronic processor is configured to create a first object in response to an input, where the first object includes first identifying metadata, receive an action, apply the action to the first object to modify the first object into a second object and modify the first identifying metadata into second identifying metadata, and link the second object to the first object. The electronic processor is further configured to receive a request to retrieve a history of the second object, and generate the history, wherein the history includes the first object, the first identifying metadata, the action, the second object, and the second identifying metadata.

Another embodiment provides a method for tracking items within a value chain. The method includes creating a first object in response to an input, where the first object includes first identifying metadata. The method also includes receiving an action, applying the action to the first object to modify the first object into a second object and modify the first identifying metadata into second identifying metadata, and linking the second object to the first object. The method further includes receiving a request to retrieve a history of the second object, and providing the history via an output device, wherein the history includes the first object, the first identifying metadata, the action, the second object, and the second identifying metadata.

Further advantages and features are set forth in the following detailed description, with reference to the figures.

DETAILED DESCRIPTION

One or more embodiments are described and illustrated in the following description and accompanying drawings. These embodiments are not limited to the specific details provided herein and may be modified in various ways. Furthermore, other embodiments may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way but may also be configured in ways that are not listed. Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used in the present application, "non-transitory computer-readable medium" comprises all computer-readable media but does not include a transitory, propagating signal. Accordingly, non-transitory computer-readable medium may include, for example, a hard disk, a CD-ROM, an optical storage device, a magnetic storage device, ROM (Read Only Memory), RAM (Random Access Memory), register memory, a processor cache, other memory and storage devices, or combinations thereof.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms, for example, first and second, top and bottom, and the like may be used herein solely to distinguish one entity or action from another entity or action without necessarily requiring or implying any actual such relationship or order between such entities or actions.

Methods described herein may be performed by one processor or a collection of processors located locally on a single device, or distributed among various local and remote locations (for example, in separate devices, located in the cloud, etc.). Additionally, all or some of the steps presented in each method may be used. In some embodiments, the steps are conducted in a different order.

As noted above, value chains, for example, supply chains, experience a large number of items moving throughout the chain, as ingredients and components are gathered, combined, and transferred from one location to the next. Additionally, multiple organizations may be involved in the creation of a product. For example, components gathered at a farm are sold to food manufacturing facilities, which then combine the components to create food product. Embodiments described herein provide systems and methods for tracking components as they move throughout the value chain. The use of a shared, distributed digital ledger, for example, blockchain, provides for a secure method of storing transactions between organizations involved in the value chain. While the disclosure primarily discusses blockchain, this is merely an example embodiment, and other immutable data store or databases, immutable ledgers may be used. In addition, in other embodiments alterable databases and/or alterable ledgers may be used.

Figure 1:
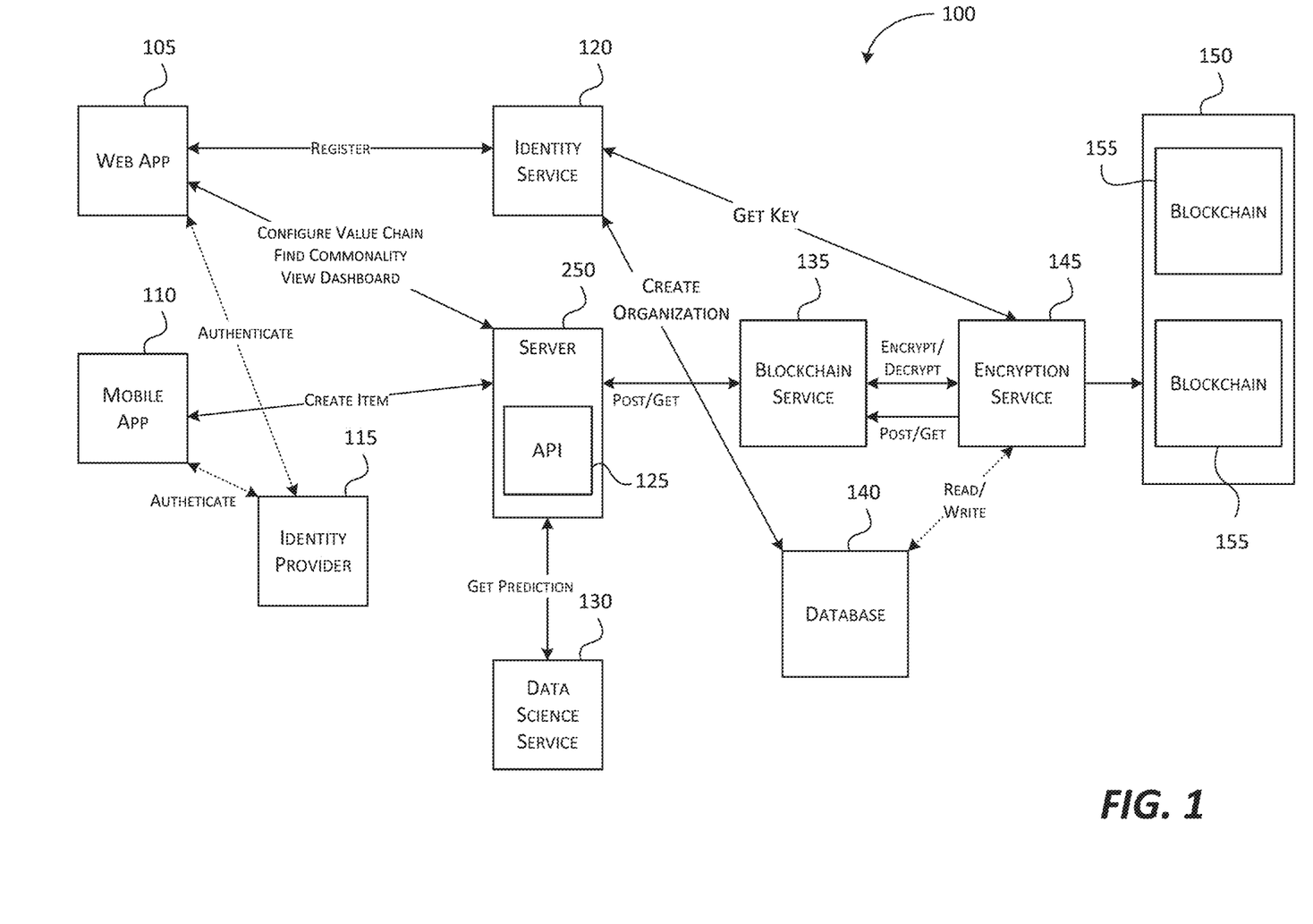
FIG. 1 illustrates a system for monitoring a value chain according to some embodiments.

FIG. 1 illustrates a value chain system configured to be used by a plurality of organizations. The example shown in FIG. 1 may also be considered a blockchain ecosystem. In the example shown, the value chain system 100 includes a web application 105, a mobile application 110, an identity provider 115, an identity service 120, a server 250, which itself includes an application programming interface (API) 125, a data science service 130, a blockchain service 135, a database 140, an encryption service 145, and a blockchain 150 that includes a plurality of blocks 155. The web application 105 is configured to create a value chain for the value chain system 100 and approve new trading partners to join the value chain system 100, as described in more detail below. The mobile application 110 is configured to post events into blocks 155 in the blockchain 150 that are input by consumers (for example, inspectors, shippers, and other organizations), which is also described in more detail below. Events posted into blocks may include shipment status, inspection reports, product conditions, and the like. In some embodiments, the web application 105 and the mobile application 110 are combined into a single application that performs the functions of both. Additionally, the web application 105 and the mobile application 110 may be accessed using personal devices for example, a mobile device, a personal tablet, a personal computer, a company or organization computer, or the like.

Figure 2A:
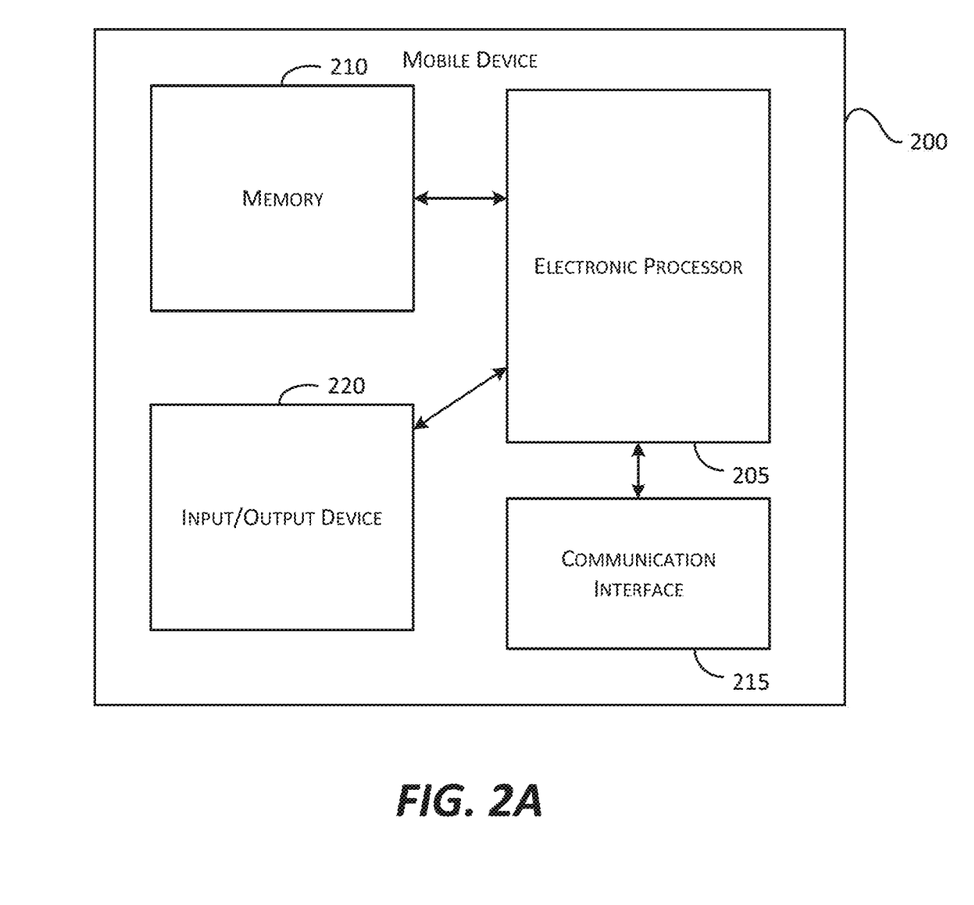
FIG. 2A illustrates a block diagram of a server of FIG. 1 according to some embodiments.

FIG. 2A schematically illustrates a mobile device 200 on which the web application 105 and/or the mobile application 110 are accessed, according to some embodiments. In the example illustrated, the mobile device 200 includes a first electronic processor 205 (for example, a microprocessor, an electronic controller, a microcontroller, or another suitable programmable device), a first memory 210, a first communication interface 215, and an input/output device 220. In some embodiments, the mobile device 200 includes additional, fewer, or different components.

The first memory 210 is a non-transitory computer readable medium. The first memory 210 can include combinations of different types of memory, for example a ROM, a RAM (for example, DRAM, SDRAM, etc.), EEPROM, flash memory, a hard disk, an SD card, or other suitable magnetic, optical, physical, or electronic memory devices. The first electronic processor 205 is connected to the first memory 210 and executes software instructions that are capable of being stored in RAM of the first memory 210 (for example, during execution), ROM of the first memory 210 (for example, on a generally permanent basis), or another non-transitory computer readable medium for example another memory or a disc. The first electronic processor 205 is configured to execute, among other things, instructions related to operations and methods described herein.

The first electronic processor 205 is configured to communicate with other elements of the value chain system 100 using the first communication interface 215, for example the identity provider 115, the identity service 120, and the API 125. Additionally, the mobile device 200 may receive inputs and provide outputs using the input/output device 220. For example, the input/output device 220 may be a touchscreen display that both receives touch inputs and displays an output, for example, a user interface. In some embodiments, the input/output device 220 includes a keyboard for receiving inputs and a display screen for displaying a user interface.

Returning to FIG. 1, in some embodiments, the web application 105 and the mobile application 110 are required to be authenticated by identity provider 115 prior to receiving access to the server 250. The identity provider 115 may be, for example, a third-party authenticator application. Additionally, the web application 105 and/or the mobile application 110 may be required to register with an identity service 120. In one example, the identity service 120 sets up a unique trade partner profile such that any actions performed by the web application 105 and/or the mobile application 110 are associated with an organization performing the actions. The trade partner profile may include a public and private key pair for the associated organization to encrypt all transactions in the blockchain 150. Organizations may post their transactions to the blockchain 150 but chose to not share the required key for encryption. Accordingly, only those with the needed key may view the transaction.

The server 250 facilitates interactions between the blockchain service 135 and the web application 105 and the mobile application 110 using the API 125. For example, the mobile application 110 may create items (for example, objects) that exist within a value chain. The server 250, in conjunction with the API 125, facilitates creation of the items and any additional actions performed on the items. The items and corresponding actions are ultimately stored in the blockchain 150. Processes and/or actions performed on items may be performed and presented in a dashboard (or GUI) provided on the input/output device 220. Other uses of the API 125 are described further below. The API 125 may be located on a server with an electronic processor configured to perform methods described herein. The server 250 may work in conjunction with a data science microservice 130.

Figure 2B:
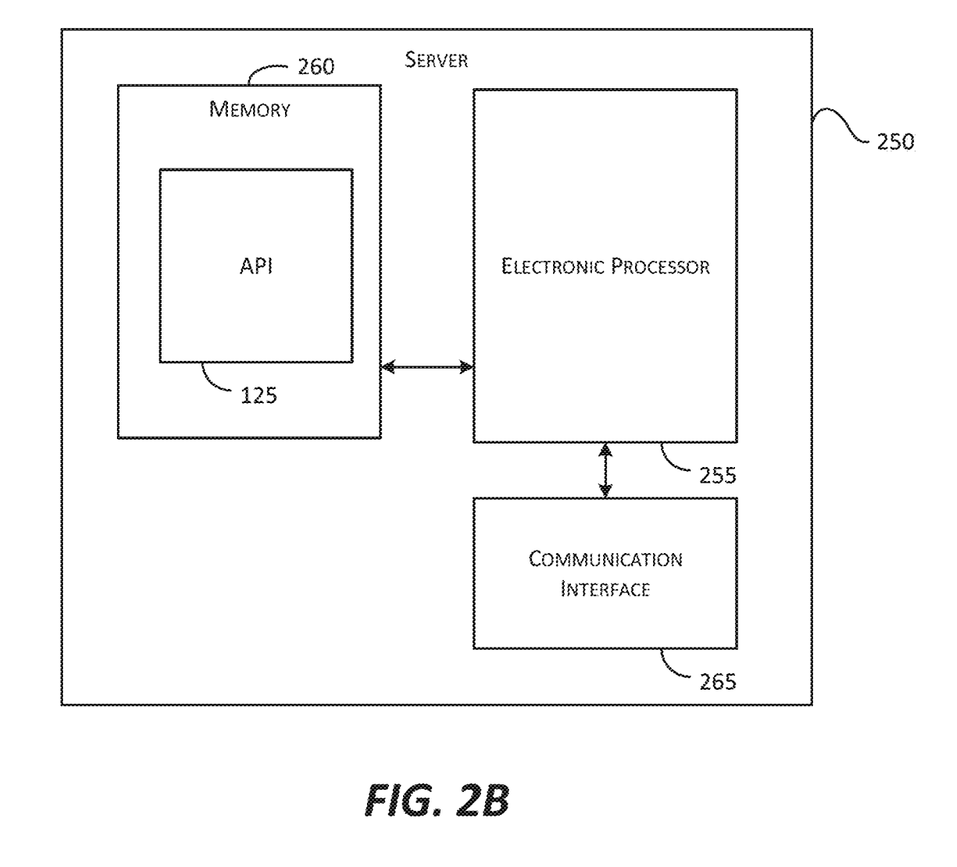
FIG. 2B illustrates a block diagram of a mobile device of FIG. 1 according to some embodiments.

FIG. 2B illustrates the server 250, which includes a second electronic processor 255, a second memory 260, and a second communication interface 265. In some embodiments, the server 250 includes additional, fewer, or different components.

The second memory 260 is a non-transitory computer readable medium and includes, for example, the API 125.

The second memory 260 can include combinations of different types of memory, for example a ROM, a RAM (for example, DRAM, SDRAM, etc.), EEPROM, flash memory, a hard disk, an SD card, or other suitable magnetic, optical, physical, or electronic memory devices. The second electronic processor 255 is connected to the second memory 260 and executes software instructions that are capable of being stored in the second memory 260. The second electronic processor 255 is configured to retrieve the API 125 from the second memory 260 and execute, among other things, instructions related to operations and methods described herein.

In the example illustrated, the second electronic processor 255 is also configured to communicate with other elements of the value chain system 100 using the second communication interface 265, for example the web application 105, the mobile application 110, the data science service 130, and the blockchain service 135.

Returning to FIG. 1, items created and actions performed through the server 250 may then be stored in a block 155 of the blockchain 150. For example, the API 125 may work in conjunction with a blockchain service 135 that posts items, events, and actions into the blockchain 150. Items, events, and actions stored in the blockchain 150 may further be encrypted by encryption service 145. Should a user of the web application 105 and/or the mobile application 110 wish to view something stored in a block 155 of the blockchain 150, the encryption service 145 decrypts the block and provides the information to the blockchain service 135.

Figure 3:
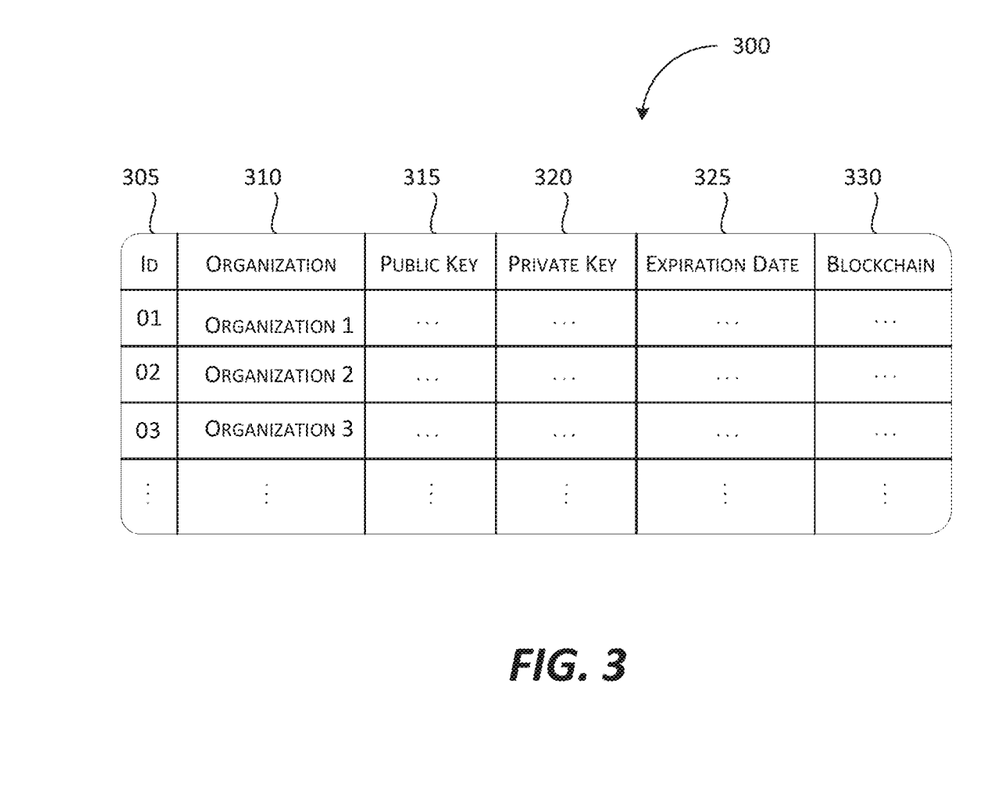
FIG. 3 illustrates a table stored in a database of FIG. 1 according to some embodiments.

Additionally, the database 140 may store information detailing organizations using the system 100 and information they send to the blockchain 150. For example, FIG. 3 illustrates a table 300. The data in table 300 is an example of a data structure stored in the database 135. The table 300 includes an identification (ID) column 305, an organization column 310, a public key column 315, a private key column 320, an expiration date column 325, and a blockchain column 330. However, these columns are merely examples of what may be stored in the table 300, and are not intended to be limiting. The table 300 may include more or less columns than illustrated.

Each organization utilizing the system 100 may be stored in organization column 310 with a respective associated ID number provided in ID column 305. The table 300 may store the public key and private key pair assigned to the organization in the public key column 315 and the private key column 320, respectively. Blocks 155 containing items, events, and actions performed by the organization may be stored in the blockchain column 330. In some embodiments, the table 300 may include an expiration date of the organization's access to the system 100, stored in the expiration date column 325. The expiration date may be, for example, a date by which the organization must re-register with the identity service 120.

Figure 4A:
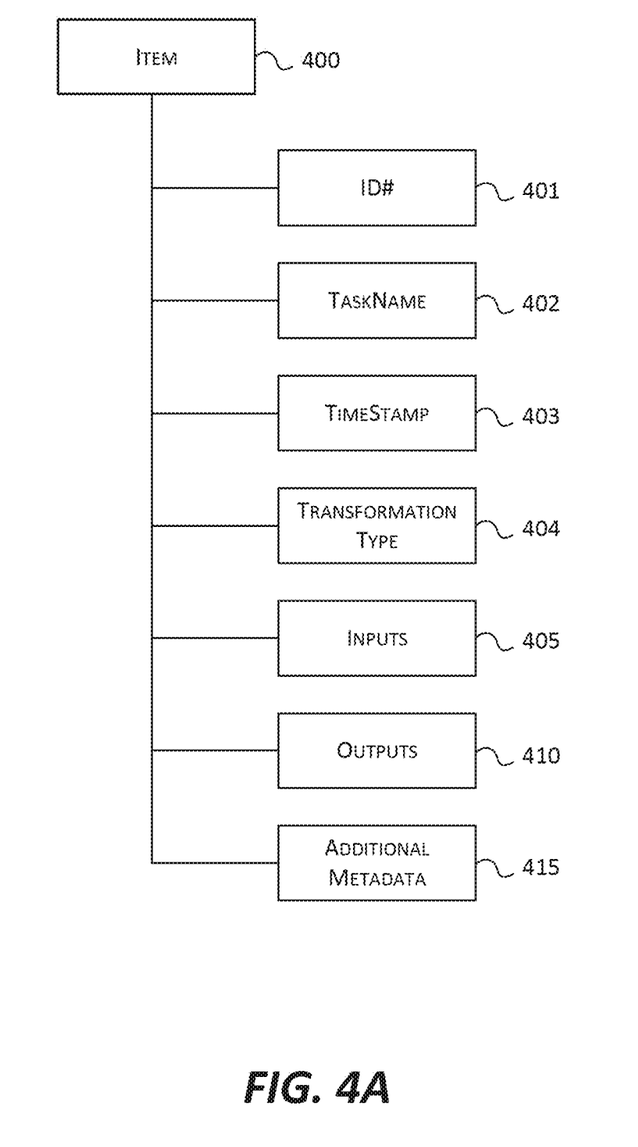
FIGS. 4A-4D illustrate metadata associated with items within the value chain of FIG. 1 according to some embodiments.

As stated above, a user of the web application 105 and/or the mobile application 110 may create objects (for example, items) by communicating with the server 250. An item may represent a physical item, for example a product, a component used within a product, or the like. Alternatively, an item may represent a virtual item, for example a property right. Created items may include a variety of defining metadata. For example, FIG. 4A illustrates an item 400 with a plurality of metadata fields. The plurality of metadata fields may include, for example, an ID field 401, a task name field 402, a time stamp field 403, a transformation type field 404, an input metadata field 405, an output metadata field 410, and any additional metadata associated with the item 400 (for example, additional metadata field 415). The ID number field 401 may include a unique number assigned to the item 400 for identification. The task name field 402 may include a task associated with the item 400. The time stamp field 403 may include a time at which the item 400 was created. The transformation type field 404 may define a set of notable changes associated with the item 400, for example a change in ownership, a change in property, a change in packaging, and the like. Other transformations include transfer of ownership from seller to distributor, a combination of several items 400 to create a product, a grouping of items 400, and the like, as described in more detail below.

Figure 4B:
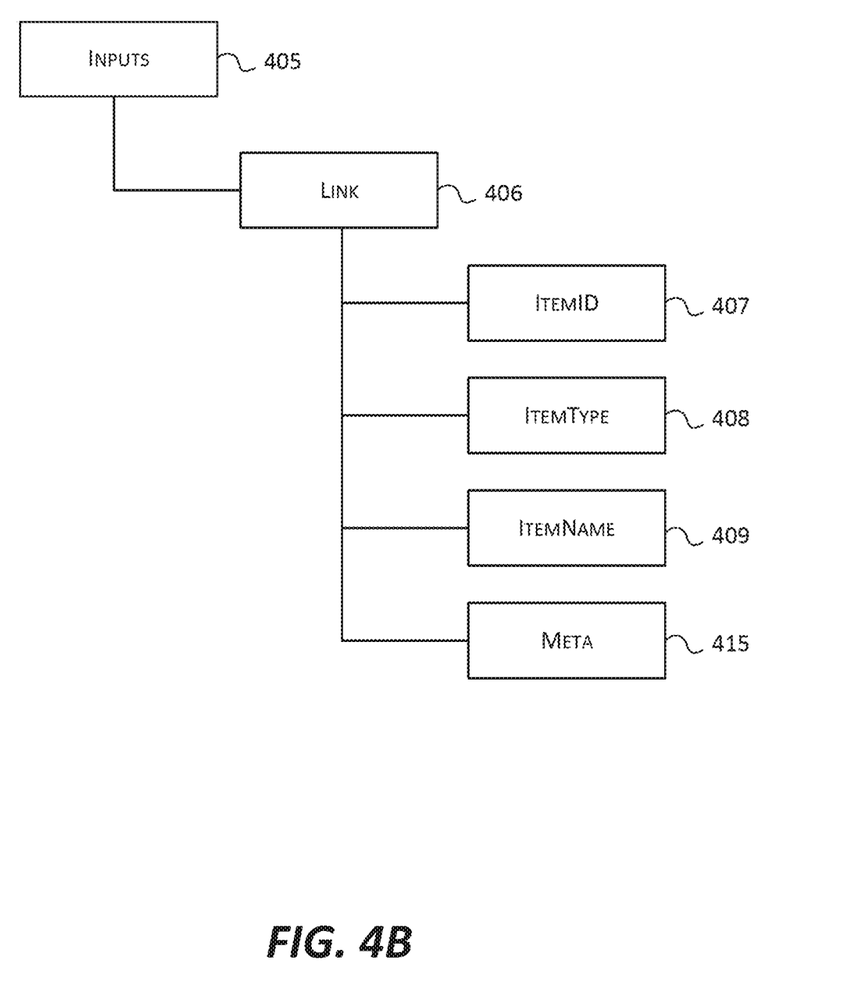
Figure 4C:
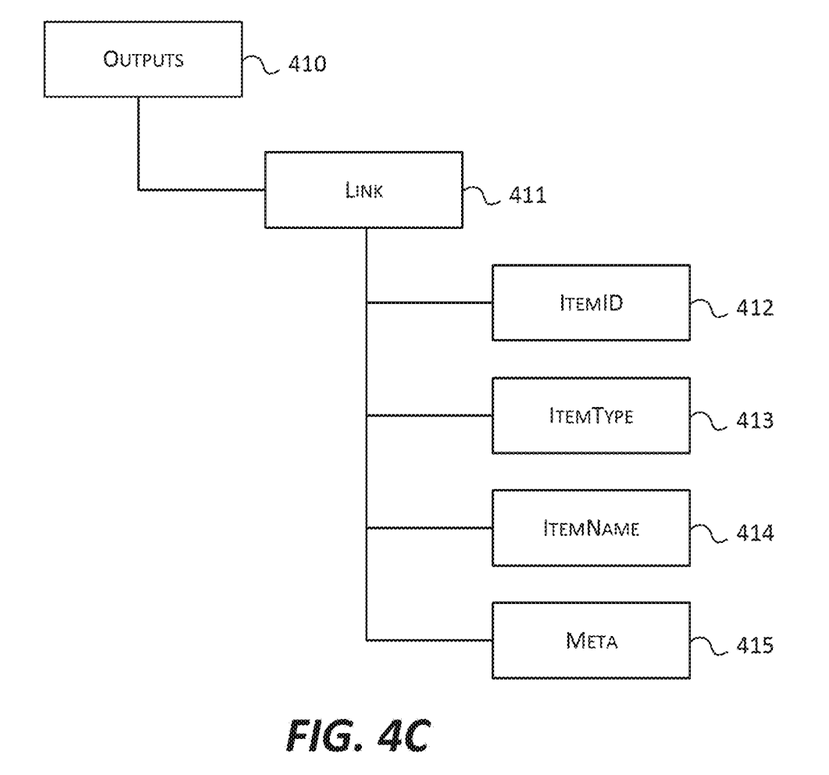

The input metadata field 405 and the output metadata field 410 may provide the item 400 with a mechanism of linking to or becoming associated with other items 400, as shown in FIG. 4B and FIG. 4C. The item 400 may become linked with another item (as shown by link 406) or become a new item or object. Links for example, the link 406 are used to build a chain of items, transformations, and other events and actions, allowing for the entire chain of transactions to be audited. Additional metadata may also be attached to the item 400, the input metadata field 405, and/or the output metadata field 410 using the additional metadata field 415. The additional metadata field 415 may be manually attached to each item 400, the input metadata field 405, and/or the output metadata field 410 by a user or organization of the system 100. For example, an organization may store unique data linking their internal process to the value chain system 100 using the additional metadata field 415. In some embodiments, the additional metadata field 415 is encrypted with a private key owned by the creator.

Figure 4D:
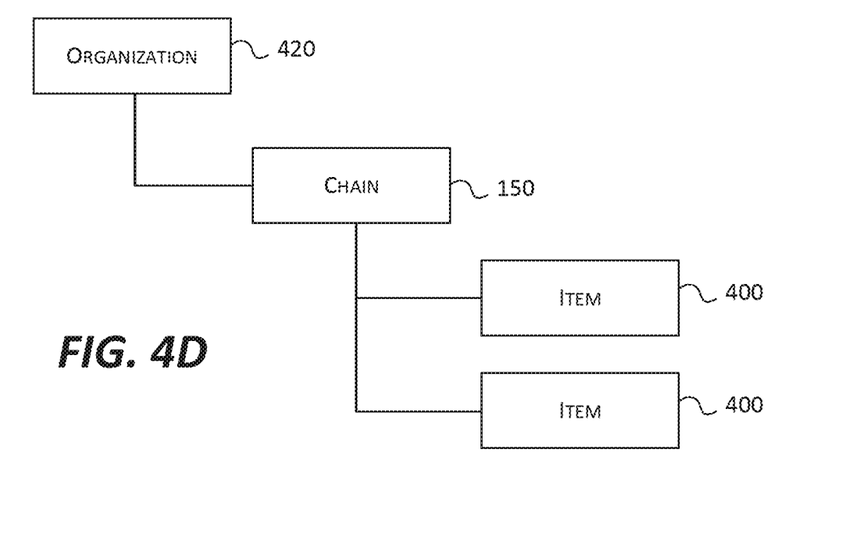

As shown in FIG. 4D, the item 400 includes a chain of metadata, as illustrated in FIGS. 4A-4C, which allows for an organization to configure a chain of items, events, and transformation that capture the entire set of transactions arising within the value chain system 100. For example, an organization 420 has control over their own blocks within chain 150, and items 400 within that chain. However, as stated above, several organizations may also work in cooperation as items are created and transformed within the value chain system 100. Several definitions for objects within the value chain system 100, and actions performed on the objects, are described below:

Items: Types of goods that may be created and tracked, for example bolts of cotton, shipping containers, wood cut from trees, car titles, and the like.

Tasks: Process steps which act upon an item. Data that is tracked at each task serves to append information to a specific item, for example with metadata. The data or metadata may describe the item, define the item, be reported on, and the like. Example actions include receiving raw materials, performing a quality control check, and applying dye to fabrics.

Transformations: Process steps which modify an item into another item. Similar to tasks, transformations may append information to any item included in the transformation. For example, packaging a plurality of shirts into a box for shipping in bulk, combining body panels to create a shell of a car, and unloading a shipping container of its contents. Transformations may be broken down into several types:

Constructive transformations: multiple items are combined to make a new item. Constructive transformations may include, for example, packing several items into a single box. Deconstructive transformations: one item is broken down into several items. For example, a butcher turns a cow into various types of steaks.

Associative transformations: two items are linked together. For example, a specific missile is linked to a military helicopter for use on a mission.

Dissociative transformation: a link between items is undone. For example, the specific missile is removed from the military helicopter without being used.

Destructive transformation: an item is destroyed. For example, the specific missile is used by the military helicopter and no longer exists.

Figure 5:
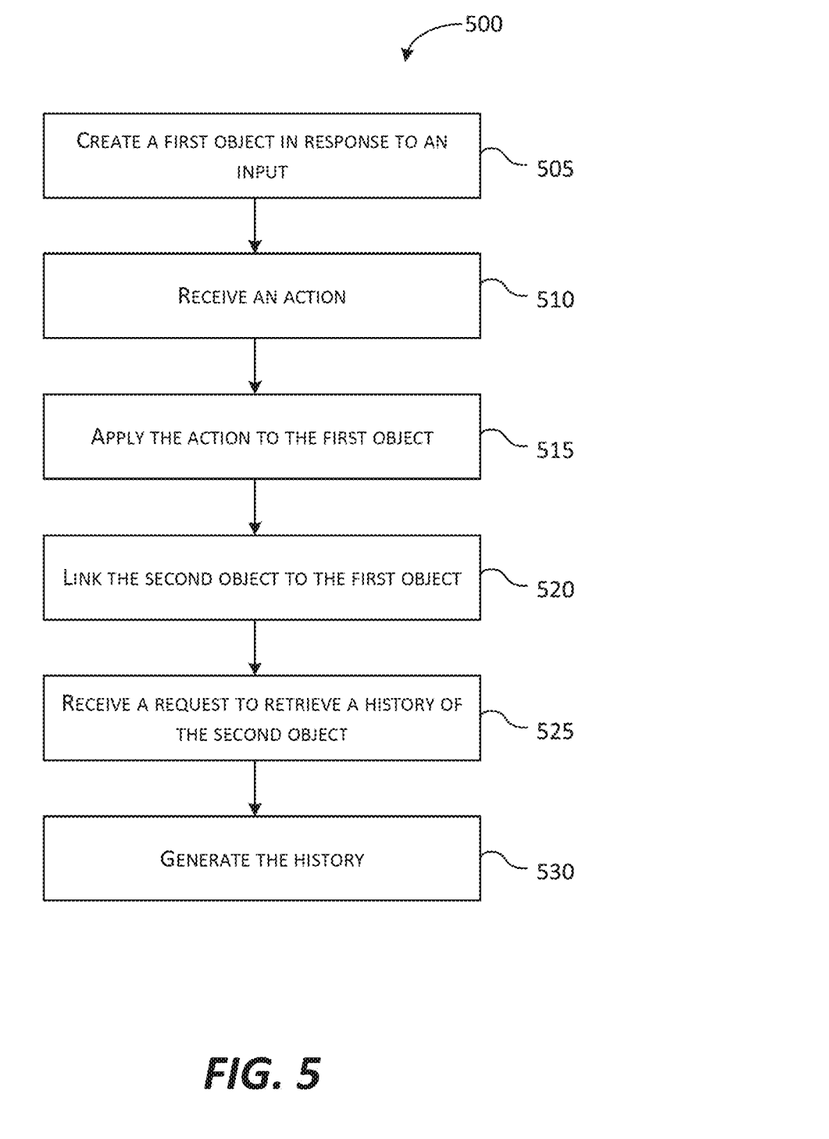
FIG. 5 illustrates a block diagram of a method performed by the server of FIG. 2A according to some embodiments.

Tasks and transformations may be referred to collectively as "actions." Whether through the web application 105 or the mobile application 110, the server 250 may use items (for example, item 300), tasks, and transformations to define a value chain within the value chain system 100. For example, FIG. 5 illustrates a method 500 for tracking items within a value chain. In one example, the method 500 is performed by the second electronic processor 255.

At step 505, the second electronic processor 255 creates a first object in response to an input. The first object may be an item with a specific item type, for example a tree, a bolt of cotton, or the like. The first object may also include a unique ID to differentiate the first object from other objects that have the same item type. In some embodiments, the unique ID is identifying metadata associated with the first object. The identifying metadata may further include a creation time, a transformation type, one or more input functions, and one or more output functions, as provided in FIG. 4A.

The input may be an input received via the input/output device 220. For example, the input is a manual input using a keyboard or a touch-screen. In some embodiments, the input is data encoded in an optical label, for example, a QR code or a bar code. The QR code or bar code may be scanned by the mobile device 200, or may be scanned by another device capable of providing an input to the second electronic processor 255, for example, an optical reader. The second electronic processor 255 receives the QR code or bar code and creates an object with a specific item type and unique ID based on the data in QR code or bar code. Additionally, the QR code may provide additional metadata for the first object, for example a storage location of the object.

The first object may be associated with an originating location. For example, if the first object is a tree, the originating location is the specific forest location at which the tree was chopped. In another example, if the first object is produce, the originating location is the farm from which the produce was gathered. The first object may also be associated with the organization responsible for creating and/or handling the first object.

At step 510, the second electronic processor 255 receives an action, for example a task or a transformation as defined above. The action (for example, the task or the transformation) may be created by a manual input via a keyboard, a touch-screen, or the like. The action may also be created based on another type of input, for example, a request from the API 125 or an additional API external to the value chain system 100. The action may be created based another type of input, for example, a received scan from a RFID reader. In some embodiments, the action is associated with an item type such that the action is applied only to objects with the specified item type. For example, when the first object is a bolt of cloth, the first object may have actions associated with it for example applying dye, sewing into an article of clothing, and the like.

At step 515, the second electronic processor 255 applies the action to the first object. Accordingly, the identifying metadata associated with the first object may be appended according to the action. For example, when the action is a task, information stored in the additional metadata field 415 may be appended to. In some embodiments, the itemID field, the task name field, and additional metadata fields may be appended to reflect the action being applied to the first object (for example, first identifying metadata associated with the first object is appended to include to second identifying metadata that is still associated with the first object). When the action is a transformation, applying the action to the first object may record the modification of the first object to a second object in addition to appending the identifying metadata (for example, first identifying metadata associated with the first object being appended with second identifying metadata associated with the second object).

In some embodiments, for example, those in which items and actions are stored in an alterable database, the identifying metadata associated with the first object may be modified rather than appended. For example, metadata fields may be rewritten to include the second identifying metadata.

In some embodiments, actions (for example, tasks and/or transformations) may be linked together. For example, a first action and a second action may be displayed as a pair. In some embodiments, linked actions may be required to be performed subsequently. If the second action is a "sorting task" that sorts several items, the second action may be required to only be performed after the first action that is an "unload truck" task. Should a user of the web application 105 and/or the mobile application 110 attempt to apply the second action prior to the first action, the first electronic processor 205 may provide a notification warning the user, system, or device performing the second action not to proceed.

Figure 6:
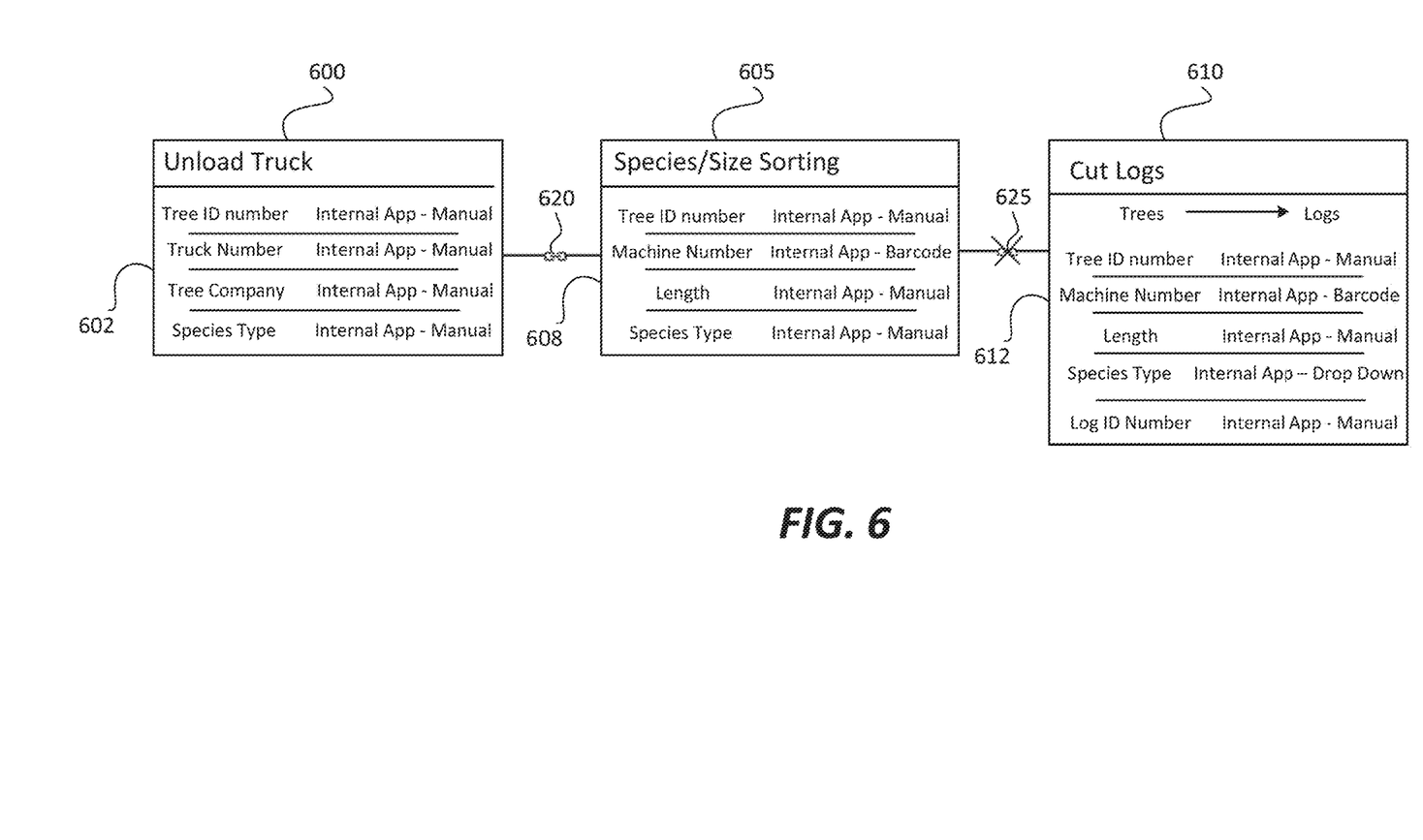
FIG. 6 illustrates a link between actions according to some embodiments.

FIG. 6 illustrates an example of linking actions. FIG. 6 includes a first action 600 with first task metadata 602, a second action 605 with second task metadata 608, and a third action 610 with third task metadata 612. The first action 600 and the second action 605 are linked, as shown by link icon 620. Accordingly, if the second action 605 is not applied after the first action 600, the second electronic processor 205 may provide a notification to the user. The second action 605 and the third action 610 are not linked, as shown by broken icon 625. Accordingly, the third action 610 can be applied at any point.

Additionally, as stated above, transformation actions may be further broken down into several transformation types, for example constructive, deconstructive, associative, dissociative, and destructive transformations. The identifying metadata associated with the first object is modified by the second electronic processor 255 in a different way for each transformation type. For example, when the second electronic processor 255 applies a constructive transformation to the first object (which is associated with the first identifying metadata), the second electronic processor 255 combines the first object with a second object (which is associated with second identifying metadata) to create a third object. The third object includes third identifying metadata based on both the first identifying metadata of the first object and the second identifying metadata of the second object. Accordingly, the third object is defined by the combination.

When the second electronic processor 255 applies a destructive transformation to the first object, the second electronic processor 255 breaks the first object into a second object with second identifying metadata, and a third object with third identifying metadata. Both the second identifying metadata and the third identifying metadata are based at least partially on the first identifying metadata, such that the second object and the third object are defined by the deconstruction.

When the second electronic processor 255 applies an associative transformation to the first object, the second electronic processor 255 modifies the first identifying metadata to include a link to a second object. When the second electronic processor 255 applies a dissociative transformation to the first object, the second electronic processor 255 modifies the first identifying metadata to remove the link to the second object. When the second electronic processor 255 applies a destructive transformation to the first object, the first identifying metadata is modified to include the destruction.

Returning to FIG. 5, at step 520, the second electronic processor 255 links the second object to the first object. When objects are linked, linking metadata may be included in the first identifying metadata associated with the first object and the second identifying metadata associated with the second object to identify the link. The linking metadata may specify the action that modified the first object to the second object.

Figure 7:
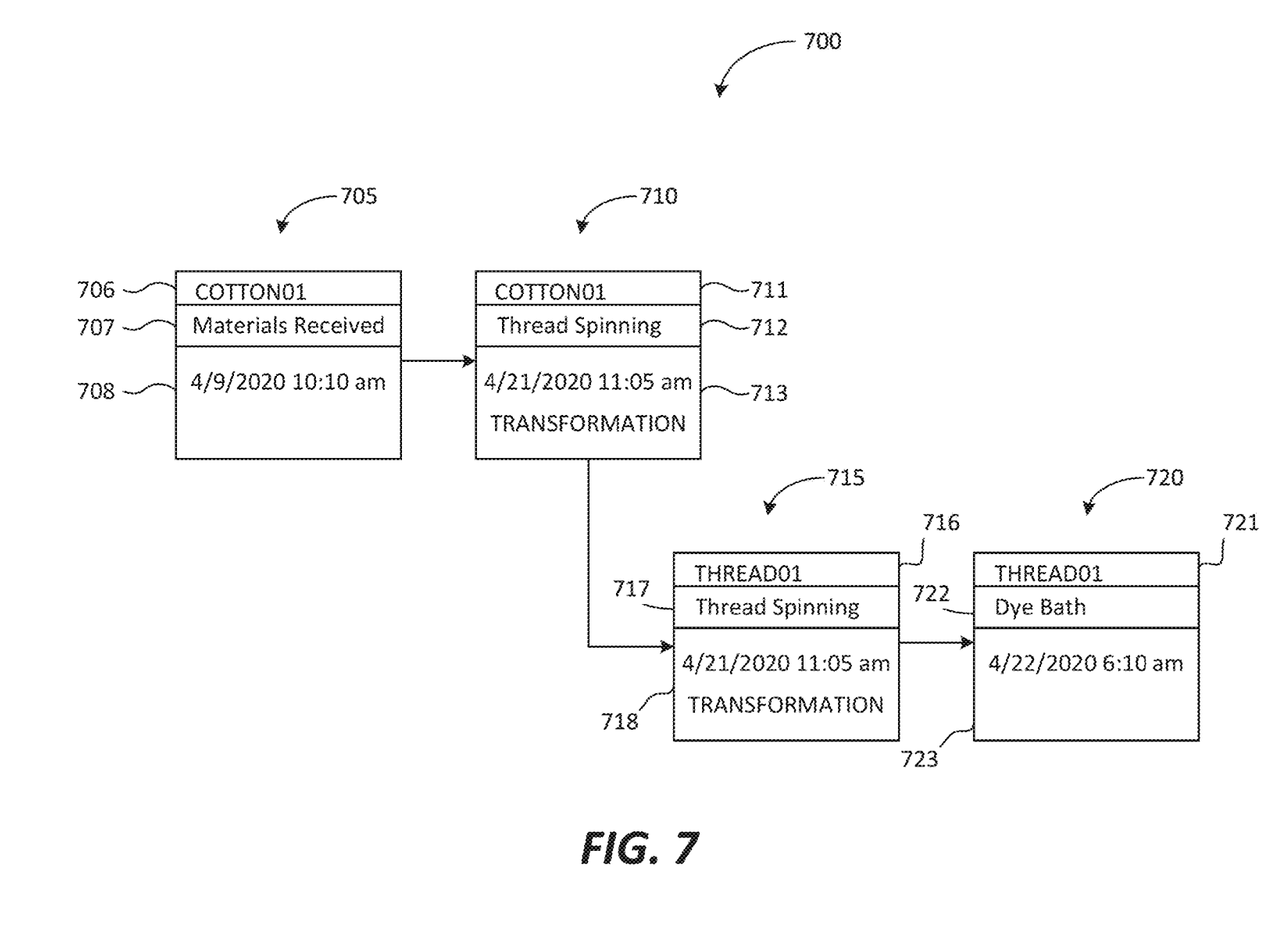
FIG. 7 illustrates a history of an item of FIGS. 4A-4D according to some embodiments.

At step 525, the second electronic processor 255 receives a request for a history of the second object. The request may be received, for example, by input/output device 220. At step 530, the second electronic processor 255 generates the history of the second object. The history of the second object may provide, for example, all objects linked to (for example, associated with) the second object, all actions performed on the second object, and the like. FIG. 7 illustrates one example of a history 700. The history 700 is composed of a plurality of blocks (for example, blocks 145) that store action information related to the second object. While the history 700 is provided in a linear fashion, the history 700 may be provided as a tree diagram based on the types of transformations performed.

The history 700 illustrates the past actions performed on the second object THREAD01. The history 700 begins with a first block 705 including a first ID field 706, a first action field 707, and a first status field 708. The first ID field 706 includes the name of a first object, COTTON01. The first action field 707 includes a first action performed on the first object, "Materials Received." The first action is a task and does not transform the first object into the second object. First status field 708 includes the time at which the first action was applied to the first object.

Second block 710 includes a second ID field 711, a second action field 712, and a second status field 713. The second ID field 711 includes the name of the first object, COTTON01, as the previous action (in the first action field 707) was a task that did not transform the first object. The second action field 712 includes a second action applied to the first object, "Thread Spinning." The second status field 713 includes the time at which the second action was applied to the first object. Additionally, the second status field 713 includes a TRANSFORMATION indication, which states that the second action is a transformation that transforms the first object into the second object. This is shown in third block 715, which includes a third ID field 716, a third action field 717, and a third status field 718. The third ID field 716 includes the name of the second object, THREAD01. The third action field 717 and the third status field 718 include the same information as that found in the second action field 712 and the second status field 713, and merely represent the transformation from the first object to the second object.

Fourth block 720 includes a fourth ID field 721, a fourth action field 722, and a fourth status field 723. The fourth ID field 721 includes the name of the second object, THREAD01. The fourth action field 722 includes a fourth action applied to the second object, "Dye Bath." The fourth status field 723 includes the time at which the fourth action was applied to the second object. While the history 700 stops with fourth block 720, the history 700 may include more or less blocks based on how many actions are applied to the second object.

Accordingly, the system 100 provides, among other things, a method for creating items, applying actions to the items, and tracking the items as they move throughout a value chain. In some embodiments, user roles may define what a user of the web application 105 and/or the mobile application 110 can do within the system 100 and associated services. For example, users assigned a "Quality Control" role may only be able to perform quality check actions that are applied to the items. Each organization that uses the system 100 may be able to create and assign unique roles to their own employees.

Figure 8:
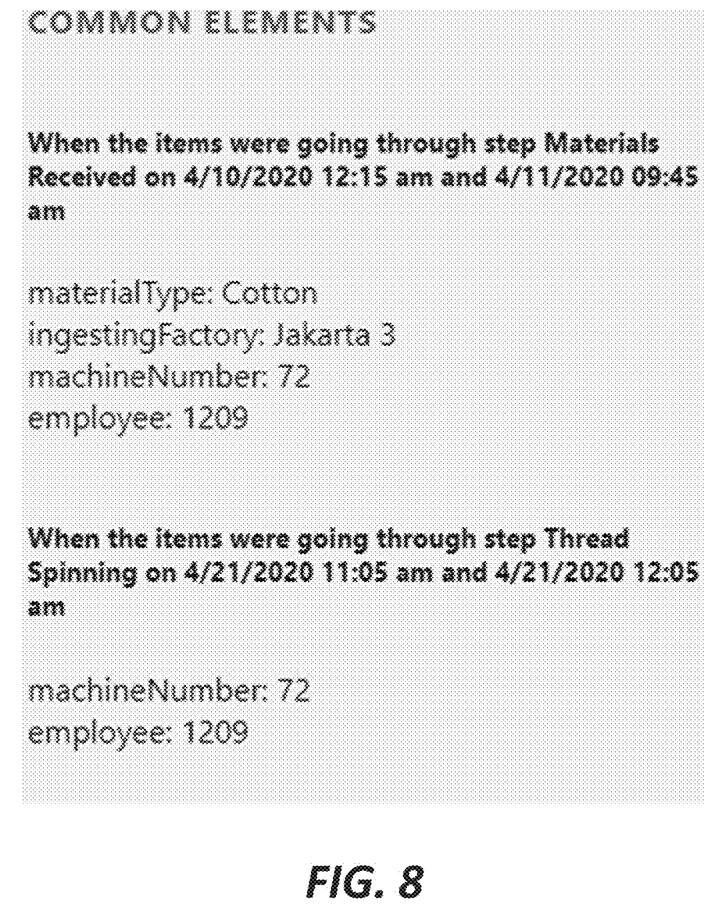
FIG. 8 illustrates a commonality checker output according to some embodiments.

In some embodiments, the API 125 is capable of performing a commonality check. The commonality check identifies overlap between multiple items (for example, the first object, the second object, a third object, etc.). In this manner, the commonality check may assist in tracing a rejected product back to its roots. For example, rejected pants may have been sewn by the same machine, or rejected shirts may have been sewed using cotton from the same supplier. To perform a commonality check, a user may input two or more items to be compared. Once all the items are input, common elements are provided, as shown in FIG. 8. These common elements may be common metadata between the items, for example metadata stored in additional metadata field 215.

Accordingly, embodiments described herein provide, among other things, systems and methods for tracking items within a value chain. Various features and advantages of some embodiments are set forth in the following claims.

What is claimed is:

1. A system for tracking items within a value chain, the system comprising:
an electronic processor configured to:
create a first programmatic object in response to an input, the first programmatic object including first identifying metadata;
receive an action;
apply the action to the first programmatic object to modify the first programmatic object into a second programmatic object and modify the first identifying metadata into second identifying metadata;
link the second programmatic object to the first programmatic object to associate the second programmatic object with the first programmatic object;
receive a request to retrieve a history of the second programmatic object; and
generate the history, wherein the history includes the first programmatic object, the first identifying metadata, the action, the second programmatic object, and the second identifying metadata.

2. The system of claim 1, wherein the action is a first action, and wherein electronic processor is configured to:
receive a second action; and
apply the second action to the first programmatic object to modify the first identifying metadata into third identifying metadata.

3. The system of claim 1, wherein the electronic processor is configured to:

create a third programmatic object in response to a second input, the third programmatic object including third identifying metadata; and combine, in response to a second action, the second programmatic object and the third programmatic object to create a fourth programmatic object, the fourth programmatic object including fourth identifying metadata based on the second identifying metadata and the third identifying metadata.

4. The system of claim 1, wherein the electronic processor is configured to:

create a third programmatic object in response to a second input, the third programmatic object including third identifying metadata; and break the third programmatic object into a fourth programmatic object and a fifth programmatic object, the fourth programmatic object including fourth identifying metadata and the fifth programmatic object including fifth identifying metadata, wherein the fourth identifying metadata and the fifth identifying metadata are based at least partially on the third identifying metadata.

5. The system of claim 1, wherein modifying the first identifying metadata into second identifying metadata includes appending the first identifying metadata.

6. The system of claim 1, wherein the input includes one selected from a group consisting of a selection using a user interface and a graphically encoded optical label scanned via a camera.

7. The system of claim 1, wherein the first identifying metadata includes a name, a creation time, a transformation type, one or more input functions, and one or more output functions.

8. The system of claim 1, wherein the electronic processor is configured to store the history in a blockchain.

9. The system of claim 1, wherein at least one of the first programmatic object, the first identifying metadata, the action, the second programmatic object, and the second identifying metadata is encrypted with a public key and a private key, and wherein the public key and the private key are associated with an organization that provided the input or the action.

10. The system of claim 1, wherein the first identifying metadata and the second identifying metadata include an association with an organization responsible for the input and the action.

11. A method for tracking items in a value chain, the method comprising:

creating, with an electronic processor, a first programmatic object in response to an input, the first programmatic object including first identifying metadata;

receiving, with the electronic processor, an action;

applying, with the electronic processor, the action to the first programmatic object to modify the first programmatic object into a second programmatic object and modify the first identifying into second identifying metadata;

linking, with the electronic processor, the second programmatic object to the first programmatic object to associate the second programmatic object with the first programmatic object;

receiving, with the electronic processor, a request to retrieve a history of the second programmatic object; and providing, with the electronic processor, the history via an output device, wherein the history includes the first programmatic object, the first identifying metadata, the action, the second programmatic object, and the second identifying metadata.

12. The method of claim 11, wherein the action is a first action, and wherein the method further includes:

receiving, with the electronic processor, a second action, wherein, when the second action is applied to the first programmatic object, the first identifying metadata is modified to become a third identifying metadata.

13. The method of claim 11, further including:

creating, with the electronic processor, a third programmatic object in response to a second input, the third programmatic object including third identifying metadata; and combining, with the electronic processor and in response to a second action, the second programmatic object and the third programmatic object to create a fourth programmatic object, the fourth programmatic object including fourth identifying metadata based on at least one of the second identifying metadata and the third identifying metadata.

14. The method of claim 11, further including:

creating a third programmatic object in response to a second input, the third programmatic object including third identifying metadata; and breaking the third programmatic object into a fourth programmatic object and a fifth programmatic object, the fourth programmatic object including fourth identifying metadata and the fifth programmatic object including fifth identifying metadata, wherein the fourth identifying metadata and the fifth identifying metadata are based at least partially on the third identifying metadata.

15. The method of claim 11, wherein modifying the first identifying metadata into second identifying metadata includes appending the first identifying metadata.

16. The method of claim 11, wherein the input includes one selected from a group consisting of a selection using a user interface and a scanning graphically encoded data via a camera.

17. The method of claim 11, wherein the first identifying metadata includes a name, a creation time, a transformation type, one or more input functions, and one or more output functions.

18. The method of claim 11, further including storing the history in a blockchain.

19. The method of claim 11, further including:

validating, with the electronic processor, one or more devices configured to provide the input and the action.

20. The method of claim 11, wherein the first identifying metadata and the second identifying metadata include an association with an organization responsible for the input and the action.

* * * * *